May 19, 1964   F. E. WITTIG ETAL   3,134,053
NON-CONSTANT CONTROLS WITH PHOTOELECTRIC SWITCHES
Filed Feb. 24, 1960

INVENTORS.
FRANZ EBERHARD WITTIG
GERHARD KEMENY
BY Paul M. Craig, Jr.
ATTORNEY

# United States Patent Office 3,134,053
Patented May 19, 1964

3,134,053
NON-CONSTANT CONTROLS WITH PHOTOELECTRIC SWITCHES
Franz E. Wittig, Munich-Sollin, Bavaria, and Gerhard Kemeny, Selb, Bavaria, Germany, assignors to Firm Gebrüder Netzsch, Maschinenfabrik, Selb, Bavaria, Germany
Filed Feb. 24, 1960, Ser. No. 10,610
Claims priority, application Germany February 28, 1959
9 Claims. (Cl. 317—130)

In the control technique, the so-called two-point control is used particularly as on-off control for solving a large variety of controlling problems on account of its simplicity and high switching efficiency. Known examples are:

The mercury contact thermometer, hoop-drop relay or the photoelectric switch.

The objection to these controls, which are simple in themselves, is, however, that their manner of operation is frequently accompanied by considerable periodical fluctuations. Through these fluctuations, a desired limitation of the deviations from the theoretical value is not obtained. These periodical fluctuations from the theoretical value can be avoided in the simplest case by a constant control, that is, for example, a proportional control. The proportional controls are, however, also open to the objection that they cannot correct completely just any disturbance. The deviations from the theoretical value are certainly kept very small. For example, it may be mentioned that changes in the actual value are converted by a system comprising a galvanometer, spot of light and photoelectric cell, into voltage fluctuations on a photocell; these change the grid voltage on a thyratron. As a result the flash point of the thyratron is shifted accordingly. In this manner a constant mean value change of an output is attained. A disadvantage of the constant control is that the thyratrons are very expensive.

Moreover it is not necessary in most cases to effect the changes of the setting values with such a high frequency as they occur in the case of alternating current. In the case of control sections with large time constants the intermittent setting value alterations can be chosen with a far smaller frequency than that of the alternating current.

Therefore the thyratron has almost always been replaced by a much simpler relay in two point connection. A relay is inferior to a thyratron primarily in that it can only switch the current on and off, while the thyratron supplies any intermediate value. This disadvantage is overcome by the so-called Gouy modulator. In the case of this Gouy modulator, periodical fluctuations are superimposed on the theoretical value. In this manner the on and off switching times of the relay change within certain limits proportionately to the deviations of the actual value from the theoretical value. The objection to the Gouy modulator is that one interferes with the theoretical value.

Thus it can be briefly stated:

A two point control possesses the advantage of great switching efficiency and the disadvantage that the actual value is subject to periodical fluctuations. The proportional regulator possesses the advantages that disturbance values can be corrected periodically and proportionally. The objection to the proportional regulator is that disturbances can only be incompletely corrected. The Gouy modulator possesses the advantage that non-constant controls can be linearized within certain ranges. This linearization is the superimposition of a proportionality control upon an on and off switching arrangement such that the percentage of on time of a heater, or the like, is selected to maintain a desired temperature condition when both the actual and theoretical temperature values of a temperature sensing device correspond to the desired temperature condition, and deviations of the actual sensed temperature value from the theoretical or preselected value provide a proportional change in the percentage of on time of the switching arrangement. It is open to the objection that the theoretical value is interfered with.

The present invention combines the advantages of the control systems above described and avoids their disadvantages. It consists in that, in a control system with photoelectric switch, means are provided for the linearization. According to a further feature of the invention it is proposed to use means for varying the dimensions of the light beam passing from a projector over a measuring element of the control to the light-sensitive element. For this purpose a movable light stop, for example a disc diaphragm, arranged in front of the projector is preferably employed. The linearizing action is therefore effected by subjecting the spot of light of the photoelectric switch to periodic alterations in its cross-sectional dimension.

The linearized two point control thus combines the advantages of the on-off control with those of a proportional regulator. A proportional regulator provides a degree of correction proportional to the error measured by a sensing device and as the sensed condition approaches the preselected condition, the correcting effect becomes less and the reduced variations in the correcting effect entail difficulties in providing fine regulation in the switching on and off of the condition establishing device such as a heater of a furnace. The objection of the Gouy modulator is avoided by the fact that the modulation is effected by varying the spot of light, with the result that the interference in the control path is carried out at a point where no influencing of the actual and theoretical values can take place.

An embodiment of the invention is illustrated by way of example in the accompanying drawing, in which.

Figure 1:
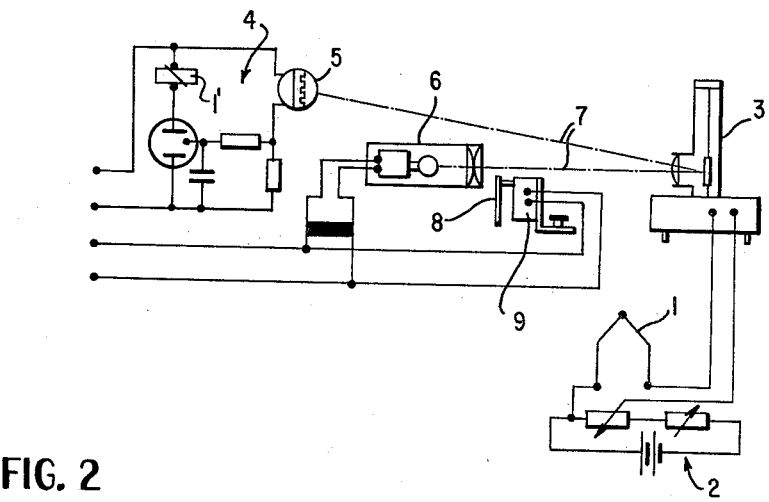
FIG. 1 shows a control in diagrammatical side elevation.
Figure 2:
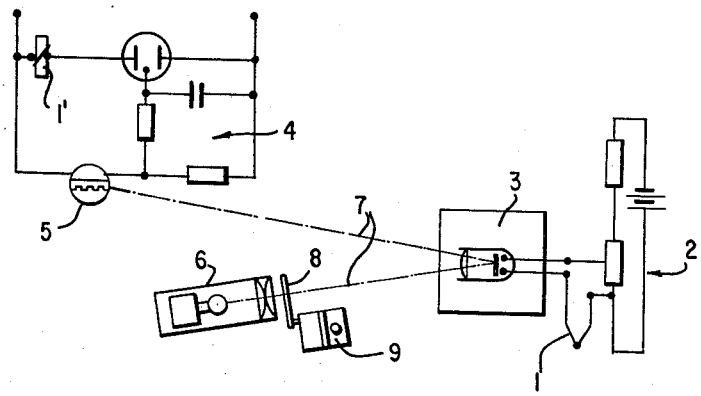
FIG. 2 is a top plan view of the control illustrated in FIG. 1.

The temperature control illustrated in FIGS. 1 and 2 consists substantially of a thermocouple element 1 responsive to a temperature established by the temperature control including relay 1', a theoretical value adjusting device 2, a reflecting galvanometer 3, a photoelectric switch 4 with photoelectric cell 5 and including a thyratron 4' for controlling the energization of the temperature control relay 1' from an alternating current source, a projector 6 for producing the light beam 7 and a rotary stop 8 introduced in the beam inlet in front of the projector and driven by a motor 9.

Figure 3:
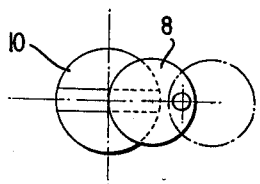
FIG. 3 shows a projector slot with light stop.

FIG. 3 shows the projector slot 10 with the stop or diaphragm 8 in open position (in dotted lines) and in screening or stop position (in full lines).

The system operates in the following manner:

The thermocouple element 1 produces a thermoelectric force corresponding to the existing temperature established by temperature control relay 1'. This thermoelectric force is compared by the method of compensation with the theoretical value on a potentiometer in the theoretical value setting device. The deviation from the theoretical value is indicated by a galvanometer deflection. If the actual value and the theoretical value correspond, the light spot shows with one side exactly on the photoelectric cell 5.

If there are positive or negative deviations from the theoretical value, light falls on the photoelectric cell or it is in the dark. If the stop motor 9 is not in operation, the regulating device acts as a simple two-point regulator. That is if, for example, the photoelectric cell 5 is illuminated, the photoelectric switch 4 becomes operative and a higher performance is controlled by relay 1'. If the spot of light passes over the photoelectric cell so that the cell 5 is again in the dark, the photoelectric indicator drops and a lower performance or power is unevenly fed to the furnace. If the motor 9 is set into operation, the dimensions of the light beam 7 will be varied by the stop 8 in front of the projector, for example merely by the fact that an eccentric disc 8 is mounted on the shaft of the motor and more or less covers the projector slot 10. The image of this slot can appear at the place where the photoelectric cell is situated and periodically changes its dimensions. If the light indicator now wanders, for example, from dark to bright on the photoelectric cell, the switching operation is not released once during the passage from dark to bright but the switching operation of the photoelectric switch takes place in variable rhythm according to the frequency of the variation in the beam cross section. The firing of the thyratron in each cycle of the alternating current supply therefor will be controlled by the photoelectric cell 5 and the change in light intensity on this cell will change the amount of power passed to the heater 1' through the thyratron 4'. The frequency of the alternating current source will obviously be much higher than the frequency of interruption of the stopping device 8. The first switching operation of the thyratron 4' will therefore have a short switch-on period and a long switch-off period and the switch-on time will gradually become longer until the image of the stop has travelled so far over the photoelectric cell that brightness prevails there. The changes in the switch-on and switch-off periods of the thyratron as the stop 8 is moved will be further varied by the superimposition of the control effect of the condition sensing thermocouple 1 which causes deflection of the reflecting galvanometer 3 and the corresponding change in the amount of illumination on the photoelectric cell 5. Both the reflecting galvanometer 3 and the rotary stop will be concurrently effective to control the illumination from the light source 6 upon the photoelectric cell 5.

The whole range in which the switching operations change constantly, in the present instance from short to longer switch-on times, is the proportional range.

It lies within the scope of the invention to employ a movable photo-electric cell instead of a movable stop or to move the projector or the galvanometer.

We claim:

1. A control system for regulating a predetermined condition comprising first means for changing said condition, control means operatively connected with said first means to regulate changes in said condition and including photoelectric means, said control means providing regulation of said first means in response to changes in illumination of said photoelectric means, light source means providing a light beam for illuminating said photoelectric means, second means responsive to changes in said condition for varying the illumination of said photoelectric means by said light source means, third means located between said light source means and said second means for periodically varying the illumination of said photoelectric means by said light source means by effectively changing the cross section of said light beam only to such an extent that a portion of said light beam always reaches said second means, and means to provide concurrent operation of both said second and third illumination varying means to superimpose their illumination varying effect on said photoelectric means to provide regulation of said condition.

2. A control system for regulating a predetermined condition comprising first means for changing said condition, control means operatively connected with said first means to regulate changes in said condition and including photoelectric means, said control means providing regulation of said first means in response to changes in illumination of said photoelectric means, light source means providing a light beam for illuminating said photoelectric means, second means responsive to changes in said condition for varying the illumination of said photoelectric means by said light source means, third means located between said light source means and said second means for periodically varying the illumination of said photoelectric means by said light source means by changing the cross section of said beam only to such an extent that a portion of said beam always reaches said second means, means to provide concurrent operation of both said second and third illumination varying means to superimpose their illumination varying effect on said photoelectric means to provide regulation of said condition, and means for selecting a level of said condition to be maintained by said system, said periodically varying means operating at a frequency which is independent of both the adjustment of said selecting means and changes in said condition during operation of said control system.

3. A control system according to claim 1, wherein said third means includes a rotary disk and motor means for rotating said disk to periodically vary the illumination of said photoelectric means by said light source means.

4. A control system for regulating a predetermined condition comprising electrically energizable means for changing said condition, control means operatively connected with said first means to regulate changes in said condition and including photoelectric means, said control means further including thyratron means for controlling energization of said electrically energizable means from an alternating current source, said photoelectric means being operatively connected to control the firing of said thyratron means in accordance with the illumination of said photoelectric means, light source means providing a light beam for illuminating said photoelectric means, first means responsive to changes in said condition for varying the illumination of said photoelectric means by said light source means, second means located between said light source means and said first means for periodically varying the illumination of said photoelectric means by said light source means by effectively changing the cross section of said beam only to such an extent that a portion of said beam always reaches said means responsive to changes in said condition for varying the illumination of said photoelectric means, and means to provide concurrent operation of both said first and second illumination varying means to superimpose their illumination varying effect on said photoelectric means to provide regulation of said condition.

5. A control system according to claim 4, wherein said electrically energizable means includes temperature control means and said condition responsive means includes thermocouple means responsive to a temperature established by said temperature control means.

6. A control system according to claim 5, wherein said thermocouple means includes a thermocouple and a galvanometer means forming part of said first means and responsive to the output of said thermocouple for varying the illumination of said photoelectric means by said light source means in accordance with the temperature of said thermocouple.

7. A control system for proportionalizing a two-point regulator to thereby regulate a condition in accordance with a predetermined value, light source means for emitting a beam of light,
first means for subjecting said light beam to periodic fluctuations by periodically varying the cross section thereof between a maximum value and a minimum value substantially greater than zero so that a continuous light beam is produced having periodic fluctuations in the cross section thereof,
two-point regulator means for regulating said condition in accordance with said predetermined value including photoelectric means adapted to receive the fluctuating light beam and electric control means operatively connected with said photoelectric means, and second means disposed between said first means and said photoelectric means for varying the illumination of said photoelectric means in response to changes in said conditions.

8. A control system for proportionalizing a two-point regulator to thereby regulate a condition in accordance with a predetermined value, light source means for emitting a beam of light, first means for subjecting said light beam to periodic fluctuations by periodically varying the cross section thereof between a maximum value and a minimum value substantially greater than zero so that a continuous light beam is produced having periodic fluctuations in the cross section thereof, two-point regulator means for regulating said condition in accordance with said predetermined value including photoelectric means adapted to receive the fluctuating light beam and electric control means operatively connected with said photoelectric means, and second means disposed between said first means and said photoelectric means operable exclusively as reflector for the fluctuating light beam for varying the illumination of said photoelectric means in response to changes in said conditions.

9. A control system for proportionalizing a two-point regulator to thereby regulate a condition in accordance with a predetermined value, light source means for emitting a beam of light, first means for subjecting said light beam to periodic fluctuations by periodically varying the cross section thereof between a maximum value and a minimum value substantially greater than zero so that a continuous light beam is produced having periodic fluctuations in the cross section thereof, two-point regulator means for regulating said condition in accordance with said predetermined value including photoelectric means adapted to receive the fluctuating light beam and electric control means operatively connected with said photoelectric means and operable as direct-current amplifier for the periodic fluctuations of the light beam, and second means disposed between said first means and said photoelectric means operable exclusively as reflector for the fluctuating light beam for varying the illumination of said photoelectric means in response to changes in said conditions.

References Cited in the file of this patent

UNITED STATES PATENTS

| Re. 20,476 | Wilson et al. | Aug. 17, 1937 |
| 2,100,460 | Specht | Nov. 30, 1937 |
| 2,123,470 | Lamb | July 12, 1938 |
| 2,218,464 | Fairchild | Oct. 15, 1940 |
| 2,302,554 | Kingsbury | Nov. 17, 1942 |
| 2,621,808 | Blakeney | Dec. 16, 1952 |
| 2,721,277 | Boundy et al. | Oct. 18, 1955 |

FOREIGN PATENTS

| 342,734 | Great Britain | Feb. 6, 1931 |